April 30, 1963  J. BAUDRY  3,087,480
PROCESS FOR OPERATING CONTROLLED IGNITION
ENGINES WITH LEAN COMBUSTIBLE MIXTURES
Filed July 15, 1960  4 Sheets-Sheet 1

Fig. 1

INVENTOR
JEAN BAUDRY

BY *Toulmin & Toulmin*

ATTORNEYS

INVENTOR
JEAN BAUDRY

INVENTOR
JEAN BAUDRY

United States Patent Office 3,087,480
Patented Apr. 30, 1963

3,087,480
PROCESS FOR OPERATING CONTROLLED IGNITION ENGINES WITH LEAN COMBUSTIBLE MIXTURES
Jean Baudry, Paris, France, assignor to Institut Francais du Petrole, des Carburants et Lubrifiants, Paris, France
Filed July 15, 1960, Ser. No. 43,132
Claims priority, application France July 21, 1959
16 Claims. (Cl. 123—119)

This invention relates to a new and useful process for operating controlled-ignition engines with lean carburetted mixtures, i.e. mixtures of fuel with a sustaining combustion agent such as oxygen or an oxygen-containing gas, e.g. air, the fuel content of which is lower than tht stoichiometrical proportion of the same (defined as corresponding to a richness of 1), which, in the case of air used as combustion-sustaining agent, is of about 15 grams of air per 1 gram of gasoline, said proportion being varied according to the kind of fuel used.

Up to the present time lean combustible mixtures have not been of practical use, except in compression-ignition engines, wherein the amount of fuel may be varied at will by adjusting correspondingly the feed of the injectors without changing the amount of air introduced, whereby the richness of the fuel mixture is brought to the desired value. In this case the ignition takes place some time after the injection of the fuel and the corresponding ignition delay is varied according to the proportion of fuel introduced, i.e. to the percentage of the full load at which the engine is operated.

On the contrary, in an engine fed with a carburetted mixture, provided with external carburetting means, good ignition conditions require, according to the known operating processes, an average richness of the fuel mixture of at least about 0.9, i.e. a fuel content of the mixture of at least 9/10 of the stoichiometrical proportion. When a motor of this type is operated in a conventional manner with a carburetted mixtured having a richness (R) of less than 0.9, ignition of the latter is irregular from one cycle to the following. This results in an unstable operation of the engine which, in turn, leads to a significant increase of the specific fuel consumption due to a considerable decrease in the ignition velocity.

It is, therefore, impossible to obtain the benefit of the lowering of the fuel consumption resulting from the use of a lean mixture when only a fraction of the maximum power of the engine is used, since the reduction of said consumption due to the lower richness of the mixture is more than compensated by the increase in consumption resulting from the incompleteness of the combustion which appears as a consequence of the irregularity of the ignition from one cycle to another.

In a compression-ignition engine the specific fuel consumption may be easily decreased when only a fraction of the maximum power of the engine is used, which is particularly the case when the latter is operated at low speed, by correspondingly reducing the amount of fuel forwarded to the injection system without modifying the amount of air introduced into the cylinders, which corresponds to adjusting the richness of the mixture.

On the contrary, when a controlled-ignition engine is operated in a conventional manner, such an adjustment of the richness is no more possible, except within a very narrow range, since ignition does not take place under satisfactory conditions with carburetted mixtures the richness of which is lower than 0.9.

This is the reason why, in this case, the reduction of the consumption together with that of the power used cannot be achieved otherwise than by a simultaneous reduction of the respective amounts of fuel and air, i.e. by limiting the flow of the combustible mixture introduced into the cylinders of the engine, while maintaining the richness of the latter at a substantially unchanged level, in most cases higher than 1.

However, said conventional method for operating controlled-ignition engines suffers from numerous drawbacks, the most important of which are the following:

(1) A higher fuel consumption per power unit due to the incompleteness of the combustion of rich mixtures, the combustion products resulting therefrom still containing significant amounts of unburnt gases. The thermal yield of the combustion, which is dependent on the fuel content of the mixture, is thus far from being optimum.

(2) The formation of substantial amounts of toxic products such as carbon oxide which are evacuated with exhaust gases and are particularly detrimental to the health.

(3) The formation of carbon deposits on the inner walls of the combustion chambers of the engine, as a result of the bad ignition conditions.

In order to avoid these serious drawbacks of the conventional feeding method, various attempts have been made for operating controlled-ignition engines with lean mixtures. These attempts are based on the following means:

(a) Increase of the turbulence of the mixture in the combustion chambers. This means does, however, not provide for more than a weak lowering of the minimum average richness at which the engine may be operated and suffers from the disadvantage of reducing the coefficient of charge of the engine which, in turn, results in the impossibility of using the full initial power of the same.

(b) Increase of the energy forwarded for carrying out the ignition of the load of the carburetted mixture. This may be achieved by means of the pre-ignition of the part of the mixture which is of higher richness than the remaining part of the latter. Said pre-ignition is carried out in a separate combustion space which may be either a distinct combustion chamber or merely a part of one single combustion chamber which is separated from the remaining part by means of an inner wall.

The chamber or zone wherein pre-ignition takes place is fed with a combustible mixture of higher richness than the average richness of the overall charge of combustible mixture and will, thereafter, be designated as "primary chamber," while the other zone or chamber, fed with a lean mixture, or even merely with air, will be designated as "secondary chamber."

Each of said chambers may have either its own feeding means, comprising separate inlet valves—as is the case in engines provided with a pre-ignition chamber—or a common inlet valve provided with deflecting means so as to distribute the loads of different richness.

According to these conventional processes, a satisfactory combustion of mixtures which, as an average, are lean, may be achieved by pre-igniting the richest mixture into the primary chamber, so as to carry out a more rapid ignition of the remaining part of the load by means of the heat energy evolved during said pre-ignition.

Such feeding devices, comprising a primary and a secondary chamber, have been described, for example, in United States Patent 1,438,619, 2,121,920 and 2,196,860. However, although they are capable of providing a good combustion of lean mixtures in controlled-ignition engines, they have not been adapted to the latter on an industrial scale in view of some major drawbacks resulting therefrom which are essentially the following:

(1) The distribution of the combustion space into both a primary chamber and a secondary chamber leads to a decrease of the thermodynamic yield which partially compensates the yield increase due to the use of a lean mixture.

Such a yield decrease results, on one hand, from the fact that the ratio of the volume to the surface of these two chambers is always lower than the corresponding ratio in the case of a single chamber, whereby the heat losses through the walls of the chamber are higher, which results in a decrease of the thermodynamic yield and, on the other hand, from the energy losses due to the required transfer of gases from the primary to the secondary chamber.

(2) The distribution into two separate zones of the combustion space requires the use of a special cylinder head or, in some cases, even a particular engine provided with a supplemental inlet valve (in the case of use of a pre-ignition chamber). Accordingly, this feeding method cannot be adapted to existing engines of the conventional type.

(3) If it is desired to obtain the full power of the engine, which requires the use of rich mixtures, the loss in thermodynamic yield is still maintained and leads both to an increase in the specific consumption and to a reduction of the maximum power.

(c) Feeding with a mixture of heterogeneous richness by means of an injection device. This third means may be eventually combined with the use of a primary combustion chamber. The nozzle may be placed either in the primary combustion chamber, where two combustion chambers are used, or otherwise in the single combustion chamber, as well as in the admission pipe above the inlet valve. In any case, this device is very expensive and results in a higher complexity of the engine. Moreover, it must be noted that, up to now, the problem of gasoline injection as well as the more general problem of properly proportioning low amounts of liquid fuel to the feed of air, have not been solved satisfactorily.

It is, therefore, an object of the present invention to operate controlled-ignition engines with lean combustible mixtures.

It is another object of the present invention to provide a substantially complete ignition of lean mixtures in controlled-ignition engines, thereby avoiding the presence of significant amounts of unburnt gases in the combustion products.

It is still another object of my invention to provide, in controlled-ignition engines, for a considerable reduction of the content of exhaust gases in toxic products such as carbon oxide.

It is a further object of my invention to substantially prevent formation of carbon deposits on the inner walls of the combustion chambers of the controlled-ignition engines.

It is still a further object of my invention to operate controlled-ignition engines with lean combustible mixtures without reducing the coefficient of charge of the engine.

It is yet another object of my invention to reduce the fuel consumption per power unit of the controlled-ignition engines by feeding the same with a lean combustible mixture under such conditions that said reduction is not, even partially, nullified by any decrease of the thermodynamic yield.

It is also an object of my invention to carry out the feeding of controlled-ignition engines with lean combustible mixtures without requiring provision for a supplemental inlet valve or for a specially adapted engine.

It is still a further object of my invention to provide a process for operating at will a controlled-ignition engine with lean combustible mixtures when only a portion of the maximum power of the engine is used and to progressively increase the richness of said mixture in proportion to the desired increase in power up to the maximum power corresponding to a feeding with a rich mixture.

These and other objects which may appear from the following description and claims are achieved according to my invention by feeding the controlled ignition engines with two separate streams of gases, one of which is a very rich combustible mixture, so as to provide the combustion chambers with an heterogeneous mixture of gases having different local richness and being so distributed that the richest part of the mixture is located in the vicinity of the spark plug.

Such a method is applicable to any conventional controlled-ignition engine comprising a homogeneous combustion chamber, i.e. as regular as possible, provided with a single combustion space, which excludes engines provided with two combustion spaces either in the form of two separate combustion chambers or of two distinct zones of a single combustion chamber delimited by means of a separating wall. For instance, hemispheric chambers are particularly well adapted to these conditions, although, however, it is still possible to practice my invention on engines having combustion chambers of a slightly different shape, provided that the latter are sufficiently homogeneous.

According to my invention a combustible mixture locally rich in the vicinity of the spark plug is obtained without separation of the combustion chamber in two distinct combustion spaces and without requiring the use of an injector or of a supplemental inlet valve.

Figure 1:
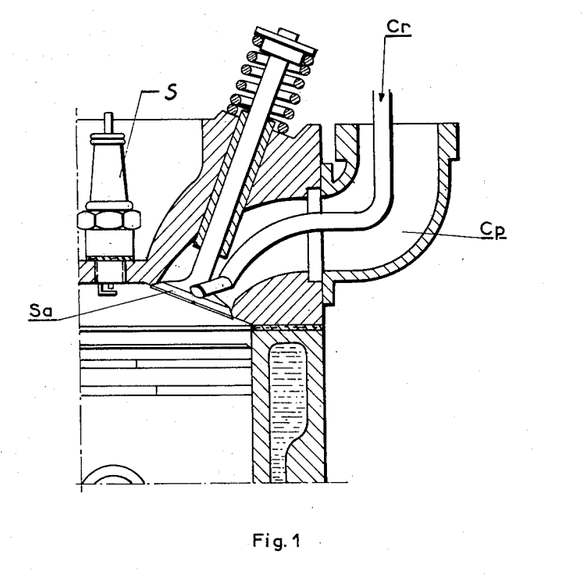
FIGURE 1 is a sectional view of a cylinder associated with the feeding device according to the invention in an engine provided wtih hemispheric combustion chambers.

Referring now to the drawings more in detail and turning first to FIGURE 1, the engine is fed with two streams of gases of different richness which are introduced in each cylinder by means of two distinct pipes, the leaner stream consisting eventually of pure air, said two streams being formed above the inlet valve $3a$.

I have observed that, by orienting the small pipe $Cr$, containing the richest mixture, substantially in the direction of that region where the spark plug $S$ is placed, it was possible to maintain, up to the moment of ignition, a local richness in this region which is sufficient to ensure the starting, under satisfactory conditions, of the combustion of gaseous mixtures having an average richness lower than 0.9 and even as low as about 0.5.

In view of the prior art such a result is quite surprising and could not be expected without the use of two distinct combustion zones, the disadvantages of which have been heretofore explained.

As a matter of fact, it was to be expected on the contrary that the simultaneous suction into the cylinder through the inlet section, resulting from the opening of the valve, of two gaseous streams of different richness, during the entire suction stroke, followed by a progressive compression of the mixture during the upward movement of the piston, would have resulted in a mixing of the two streams, whereby the overall mixture would have been homogenized, thus leading to the same result as that achieved by feeding with a single stream of lean mixture. This is certainly the reason why a separation of the combustion chamber in two distinct combustion spaces has been proposed in the art in view of a feeding with lean mixtures, since it provides for a substantial separation of the two gaseous streams of different richness.

Moreover, the idea of using a heterogeneous mixture obtained from two gaseous streams of different richness is quite unconventional in view of the teaching of the prior art. One of the main objects of the prior art is to carry out the most perfect homogenization of the combustible mixture in the cylinders, said homogenization being considered as an important factor for improving the yield of the engine.

The success of the process according to the present invention proves, on the contrary, that a most complete and perfect combustion of a lean mixture, having, for instance, an average richness of less than 0.9, may be effected in a controlled-ignition engine, due to the carrying-out of a sufficient heterogeneity of the local richness of said lean mixture.

Said heterogeneity of local richness may be obtained according to the present invention by means of two gaseous streams of different richness, delivered through two pipes $Cp$ and $Cr$, respectively (FIGURE 1), ending above the inlet valve $Sa$. The richness of at least one of the gaseous streams is adjusted to a value which must be sufficiently high to effect a good ignition of the same by means of the spark plug (richness of at least 1.0), but which may be chosen as high as desired. The richness of the other stream is selected at will in the range of zero (in the case of air) to 1.0, so as to be adapted to the average richness of the overall mixture at which it is desired to operate the engine, taking into account the respective proportions of the two streams delivered through the two inlet pipes.

Experiments have shown that the lowest acceptable average richness, ensuring a stable functioning of the engine and a satisfactory combustion, was attainable with the most heterogeneous mixtures obtained by introducing the entire amount of fuel in the form of a very rich mixture (having a richness which is at least equal to 5 and preferably in the range of 20 to 50) through the small pipe $Cr$, substantially oriented in the direction of the spark plug, while mere air is introduced through the conventional admission pipe $Cp$.

The richness of the richest mixture may be as high as desired, although, in most cases, it must be preferably lower than about 100, so as to provide for a sufficiently accurate dosage of low amounts of fuel without requiring the use of special devices of high accuracy such as, for instance, injectors.

These conditions for carrying out the process of my invention have been applied for operating a power engine provided with external carburetting means, with a combustible mixture having an average richness of 0.5. Naturally, the average minimum acceptable richness of the combustible mixture ensuring satisfactorily the operation of the engine is dependent in each given case on the shape of the combustion chamber and particularly on the relative positions of the inlet valve $Sa$ and the spark plug B in said engine.

Figure 2:
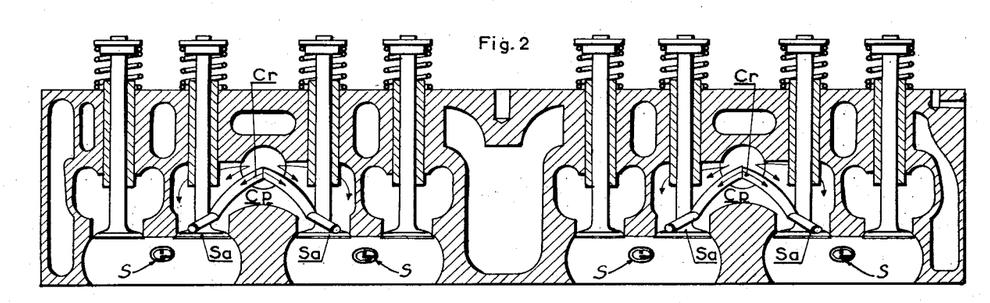
FIGURES 2 and 2A show the adaption of the feeding device according to the invention to a four-cylinder engine provided with top valves in straight line.
Figure 2A:
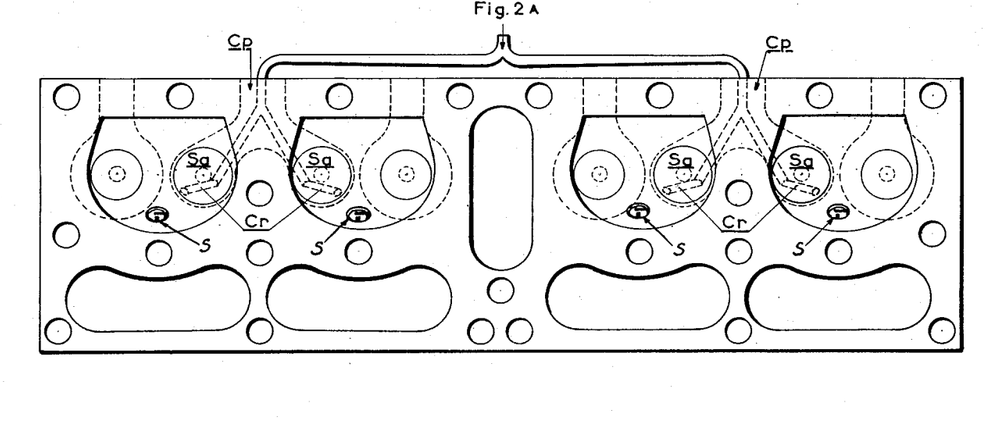

In engines of the type shown in FIGURES 1, 2 and 2A, provided with hemispheric combustion chambers and top valves in straight line, the small pipe $Cr$, containing the richest stream, has its end oriented substantially towards the spark plug S, which end is placed close to the valve head $Sa$. According to these figures, given as example, said small pipe $Cr$ is placed inside the conventional admission pipe $Cp$ but any other emplacement may be chosen, provided that said pipe $Cr$ opens above the single inlet valve.

Since the use of lean mixtures results in a reduction of the maximum power given by the engine, such use must be restricted to some periods where only a reduced power is to be used and it is therefore necessary to vary the average richness of the combustible mixture as a function of the power used.

It is particularly necessary to have the possibility of adjusting the richness of the mixture to that value at which the maximum power is obtained at a given speed (richness of about 1.10). The use of lean mixtures must therefore be limited to the cases where only a fraction of the maximum power (full charge) is used at a determined speed.

According to the process of my invention, the average richness of the mixture may be varied continuously and instantaneously from the minimum value ensuring a regular operation of the engine, i.e. about 0.5, up to the value at which the maximum power is obtained, i.e. about 1.10. Said adjustment of the richness may be carried out by progressively increasing the rich stream, while maintaining the amount of air introduced in the engine substantially unchanged, at a given speed.

I have observed, by experience, that the degree of heterogeneity of the mixture must be reduced in proportion to the increase of the average richness of the same in order to avoid that the local richness of the mixture in the vicinity of the spark plug is too high.

This may be achieved very simply by transferring an increasing part of the rich stream to the stream of air (introduced through the conventional admission pipe) in proportion to the desired increase of the average richness of the overall mixture.

According to this method, an average richness of the overall mixture corresponding to that required for obtaining the maximum power of the engine is obtainable by means of a mixture of low heterogeneity, as is the case according to conventional carburetting processes. For each desired portion of the load the ratio of the amount of the rich mixture introduced through the small pipe $Cr$ to the amount of the rich mixture transferred to the air stream is susceptible to substantially large variations about the optimum ratio, without bringing about any significant change in the yield of the engine. Said optimum ratio decreases in proportion to the increase in the average richness of the load. This means that the lower the average richness, the higher must be the degree of heterogeneity of the combustible mixture. The lowest average richness of the mixture at which a controlled-ignition engine is operable according to this invention is exactly that corresponding to the maximum heterogeneity of said mixture.

By this possibility of varying continuously the average richness of the mixture down to the minimum usable richness (which, in the case of the engine hereafter described, is 0.5 when operated with half load at 2000 runs per minute), the load of the engine may be adjusted while maintaining a maximum filling with air of the cylinders. This adjustment method is similar to that conventionally used for operating engines of the diesel type, according to which the load is adjusted exclusively by means of a variation of the richness, obtained by varying the amount of fuel delivered, while the filling with air of the cylinders is kept unchanged.

Between 50 and 0% of the full charge the amount of fuel introduced must be adjusted by variation of the coefficient of filling, obtained by means of a narrowing of the admission section. Within this range of load values the average richness is kept to a substantially unchanged value in the vicinity of the lowest usable richness, which, in combination with the variation of the coefficient of filling, results in a proportional decrease of the respective streams of rich mixture and air of admission.

Figure 3:
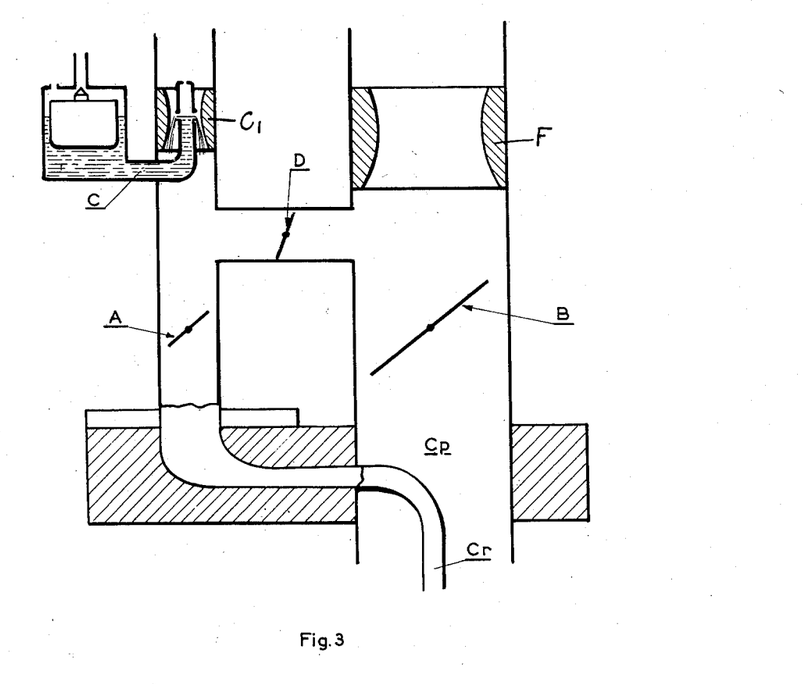
FIGURE 3 shows a carburetting device which may be used advantageously for carrying out the present invention.

The rich mixture may be obtained either from a specially adapted carburettor or from any other equivalent device. FIGURE 3 is representative of a carburettor especially adapted for practicing the process of my invention.

Said carburettor is provided with a throttle valve A for regulating the gaseous stream into the pipe $Cr$. The throttle valve B is used for adjusting the flow of air in the conventional admission pipe $Cp$. These two throttle valves may be operated jointly so as to keep the passage sections of the two pipes in the same ratio to one another, whereby the average richness of the mixture is kept unchanged in that range of the load values wherein the latter is adjusted by varying the volume of gases introduced (range of 50 to 0% of the full charge for the engine hereafter described, operated at 2000 runs per minute). The throttle valve D is provided for adjusting the proportion of the rich mixture to be diluted in the air of admission. The opening of said throttle valve controls the enrichment of the admission mixture in that range of the load values at which the admission volume is kept at its maximum value and takes place, therefore, only after the complete opening of the throttle valves A and B, whereby the operation of said three throttle-valves may be achieved through one single control device. (See FIGS. 4A, 4B, and 4C, described infra.)

The process of my invention is particularly well adaptable to controlled-ignition engines having valves placed in head; i.e. the valves of which are placed with their stem at their upper part, generally controlled by tilters, and their head at their lower part and are arranged substantially vertically or inclined on the vertical. Besides, among the latter engines it is preferred to carry out this invention with those provided with substantially hemispheric combustion chambers or, more generally, with combustion chambers which are not favorable to a mixing of the two separate feeding streams by turbulence, but which are more particularly adapted for obtaining the maximum advantage by the use of this invention.

As an example of the process of the present invention, experiments are hereafter described which have been effected with a French experimental engine as described by M. Kermarrec and B. Sale in "Revue Générale de Mécanique—Mars 1951."

This monocylinder controlled-ignition engine having a bore hole of 80 millimeters and a stroke of 100 millimeters, provided with a hemispherical cylinder head and a distribution by means of a cam-shaft in head, is connected to a brake dynamo measuring the brake power of the engine. The compression ratio is 7 and the speed 3000 runs per minute. The fuel used is a gasoline having an octane number of 82 (Research method).

The following experiments have been carried out:

I. Determination of the operating conditions corresponding to minimum specific consumption in the case of conventional feeding.

In a first set of experiments are determined, at different loads, the minimum specific consumptions of the engine expressed in grams of fuel per horse power and per hour, the feed consisting of one single stream of a carburetted mixture of gasoline with air the richness and the admission rate of which are systematically varied by operating the throttle value of the carburettor or modifying the diameter of the jet.

The richness values of the carburetted mixture, ensuring the minimum specific consumption, are in the range of from 0.85 to 0.95 with a load of 40 to 80% of the full load, and increase up to 1.0 at full load.

It must be noted, however, that said minimum specific consumptions are of no interest in practice for the following reasons:

(a) Each of them correspond to the use of a different jet and they are, consequently, purely theoretical since it is impossible, with a single carburettor, to provide at will all different mixtures ensuring the minimum specific consumptions at the different loads and speeds of the engine.

(b) Each of them corresponds to limit conditions of operation and therefore to a very unstable functioning when the smallest changes occur in said conditions, resulting in misfires and, consequently, in a significant increase of the specific consumption or even in a complete stopping of the engine.

(c) The combustion of the carburetted mixture being very slow, said combustion is not complete when the outlet valve opens, even if the sparking advance is increased, which results in a rapid deterioration of said valve.

Accordingly, the carburettors employed on the conventional engines are always adapted to provide for a mixture of a richness which is sufficient to ensure a satisfactory working of the engine at all speeds and for all loads, the minimum of richness corresponding to those conditions being generally close to 1.0.

II. Determination of the specific consumptions when using conventional feeding means (carburetted mixture having a richness of 1.0).

According to this second set of experiments under the conventional feeding conditions, the above-described engine has been fed with a curburetted mixture having a richness of 1.0 and the corresponding specific consumptions have been noted at each load of the engine.

III. Determination of the specific consumptions when operating the engine with a carburetted mixture according to this invention.

In a third set of experiments the same engine has been fed with two gaseous streams of different richness, forwarded by a feeding device comprising a special carburettor, as shown in FIGURE 3, and two distinct pipes delivering said streams above the inlet valve, as shown in FIGURE 1. The richness of the richest mixture has been chosen equal to 30 for all loads, the lean mixture consisting either of mere air for loads of 50% or less of the maximum load or a carburetted mixture the richness of which increases in proportion to the load increase from 51% up to 100% of the maximum load.

*Table 1*

| Percent of the maximum load | Specific consumption with conventional feeding (g./H.P.=h.) | | Double feeding according to this invention | |
|---|---|---|---|---|
| | Minima | Richness of 1.0 | Average richness | Specific consumption (g./H.P.=h.) |
| 100 | 238 | 238 | 1.00 | 238 |
| 80 | 235 | 256 | 0.76 | 227 |
| 60 | 258 | 283 | 0.60 | 243 |
| 50 | 275 | 300 | 0.55 | 261 |
| 40 | 305 | 330 | 0.58 | 287 |

It appears from the foregoing results that for all loads lower than the maximum load, the specific consumption attained when operating the engine according to the process of my invention is always lower than either the corresponding specific consumption under normal practical conditions (richness of 1.0) or even the minimum theoretical specific consumption.

Similar advantages have been obtained at different speeds such as, for instance, 2000 runs per minute (minimum richness of 0.5) and 4000 runs per minute (minimum richness of 0.62) and with different compression rates.

The process of my invention may as well be used for operating multicylinder engines. Thus, for example a bi-cylinder engine "Dyna Panhard," air-cooled, of the "flat-twin" type, having a cylinder capacity of 850 cm.³ was operated at half load with a specific consumption of 195 g/H.P.-h. according to the invention, as compared with a specific consumption of 220 g/H.P.-h. corresponding to the use of a conventional feeding method by means of the original carburettor.

Besides, the following advantages of the process of the invention have been observed:

(a) The content of the exhaust gases in carbon oxide is very low as appears from the following table, summarizing the carbon oxide contents of the exhaust gases during the three sets of experiments heretofore referred to:

*Table II*

| Percent of the maximum charge | Carbon oxide content of the exhaust gases (percent) | |
|---|---|---|
| | Normal feeding | Feeding according to the invention |
| 100 | 1.0 | 1.0 |
| 80 | 1.0 | 0.09 |
| 60 | 1.0 | 0.05 |
| 50 | 1.0 | 0.04 |
| 40 | 1.0 | 0.04 |

At slow and idle running (average richness 0.62) the carbon oxide content of the exhaust gases was only 0.008% according to the invention, while under conventional conditions said content was as high as 2 to 6% (according to the adjustment of the throttle-down).

(b) The temperature of the exhaust gases, upon which depends the maintainance of the outlet valves under good operating conditions, has been proved to be lower or at most equal to that observed under normal feeding conditions (richness of 1), as shown in the following table, wherein the temperature obtained during the experiments summarized in Table I are quoted.

*Table III*

| Percent of the maximum charge | Temperature of the exhaust gases (° C.) | |
|---|---|---|
| | Conventional feeding (richness of 1.0) | Double feeding according to the invention |
| 80 | 638 | 590 |
| 60 | 628 | 507 |
| 50 | 624 | 450 |

As has already been mentioned, the present invention is not to be limited by any of the characteristics herebefore given as examples. The shape of the combustion chamber may thus be substantially different from the hemispherical shape and may correspond, for instance, to the so-called "bath-shape" although the first one is preferred. It is also possible to use, as combustibles, a gas, for instance natural gas, as well as a liquid such as gasoline or even kerosene, when the engine is provided with an efficient heating device.

The process of my invention may be applied with like success to multicylinder engines as to monocylinder ones, the resulting combustible saving being, however, the larger in the former case. Such a phenomenon may be explained by the fact that the carburettors of monocylinder engines, for example of the type aforedescribed, may be adjusted so as to forward a substantially stoichiometric mixture, whereas the carburettors associated with multicylinder engines must be adjusted for providing a mixture of relatively high richness (average richness of about 1.1 in most cases) so as to forward to each cylinder a sufficiently rich mixture for ensuring good ignition conditions despite the irregularity of richness from one cylinder to the other due to the influence of the admission pipe. Under such conditions some of the cylinders are unnecessarily fed with a mixture which is too rich and the excess of fuel in said mixture leads to the formation of carbon deposits and carbon oxide without providing any power increase.

On the contrary, when operating with a lean mixture, according to the process of this invention, the irregularity of richness from one cylinder to another does not result in any increase of the specific fuel consumption, due to the realization of a substantially complete combustion without formation of carbon deposits or of CO, within the broad range of richness of the lean mixtures used according to this invention.

The present invention is also concerned with a particular device adapted for carrying out the feeding of controlled-ignition engines by means of two gaseous streams of different and adjustable richness such as those operable according to the aforedescribed process.

Such a device, illustrated by way of example in FIGURE 3, substantially comprises in combination, a pipe for air-admission $Cp$, a pipe for admission of a rich carburetted mixture $Cr$ which pipe is associated with carburetting means C providing said mixture, the effective passage section in these two pipes being controlled by means of two synchronized throttle-valves A and B, respectively, and a connecting pipe, opening below the carburetting means and also comprising a throttle-valve D for adjusting the effective passage section so as to control the proportion of rich mixture desired to pass to the air-admission pipe, whereby the relative richness of the two streams issuing from the two pipes is adjusted.

By "opening below the carburetting means" I wish to be understood that said connecting pipe opens in that part of the pipe which is provided with said carburetting means, which is comprised between the latter and the cylinder, the other part of the same pipe being defined as placed "above" the carburetting means.

The carburetting means may consist of a carburettor provided, for instance, with a jet $C_1$, a choketube, or venturi tube or the like and with the corresponding feeding means, eventually comprising any known improvement (such as a regulating or automatic controlling device or a feed pump). It may be of the vertical or horizontal type or reversed, or of any other type.

It is also possible to make use of an injector placed above the connecting pipe, instead of the carburettor.

The throttle-valves of the admission pipes may be placed at will above or below the connecting pipe and are preferably operated in synchronism so as to provide for proportional variation of the passage section in the two admission pipes, said passage sections being adjusted between the "closed" position or a position of the throttle-valve of slight opening, corresponding to the rest position of the accelerator of the engine and the full opening position attained generally with a position of the accelerator intermediate between the rest position and that corresponding to the maximum power.

The operation of the throttle-valve provided in the connecting pipe may also be subjected to that controlling device by which the two synchronized throttle-valves of the admission pipes are already operated, so that the opening of said throttle-valve in said connecting pipe does not take place until the two other throttle-valves are substantially completely opened.

Figure 4A:
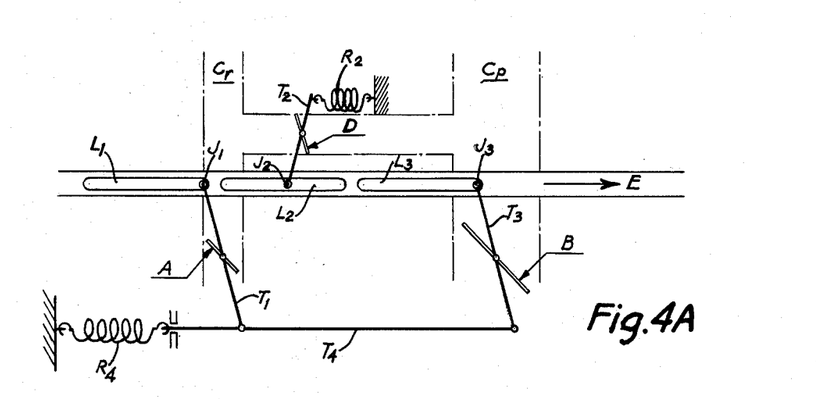
FIGS. 4A, 4B, 4C illustrate schematically an example of synchronizing the three throttle valves illustrated in FIG. 3, and showing the valves in three different operating positions.
Figure 4B:
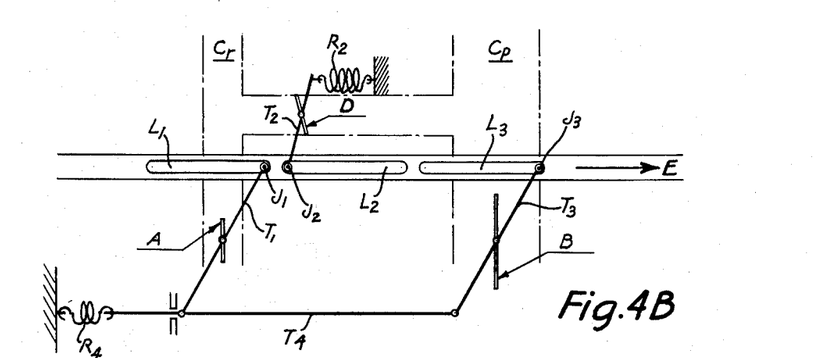
Figure 4C:
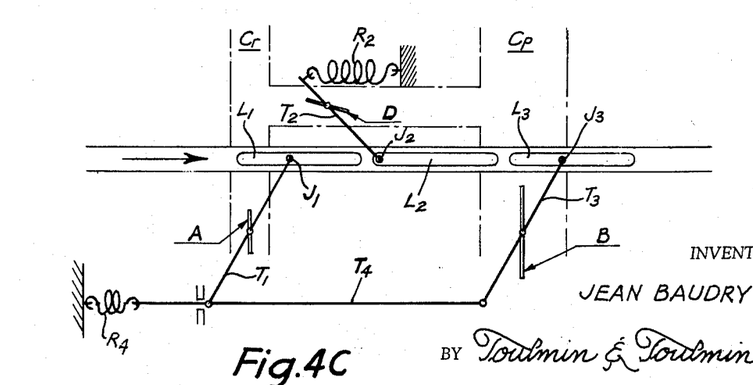

The operation of this device interconnecting valves A, B and D is explained below with reference to FIGS. 4A, 4B, and 4C representing various relative positions of the three throttle valves.

The device essentially comprises a rod E connected to the accelerator drive, and the shifting of which is effected parallel to its axis (see arrow). This rod has three longitudinal grooves $L_1$, $L_2$ and $L_3$ in the interior of which bolts $J_1$, $J_2$, $J_3$, respectively, can slide also in axial direction of rod $e$. Bolts $J$, $J_2$ and $J_3$ are pivoted to rods $T_1$, $T_2$, $T_3$, respectively; the latter rods are attached to the shafts of throttles A, D, B, respectively, in such a manner that they can pivot about the respective axis of these throttles and imparting upon the throttles a rotation. Furthermore, rods $T_1$ and $T_3$ are interconnected by a junction rod $T_4$ providing for the synchronization of the movements of throttles A, B. Rods $T_4$ and $T_2$ are maintained by springs $R_4$ and $R_2$.

In the position of FIG. 4A the bolts $J_1$ and $J_3$ have just started to shift toward the right thus following a corresponding rightward shifting of rod E, because spring $R_4$ urges the bolts against the right hand terminal side of grooves $L_1$ and $L_3$, respectively.

As a result thereof throttles A and B open progressively with increasing rightward displacement of rod E. During this time, however, bolt $J_2$ is shifted in the interior of groove $L_2$ without meeting any obstacle so that throttle D associated to junction bolt $T_2$ maintains its closed position until the moment when the position of rod E corresponds to the maximum opening of throttles A and B and bolt $J_2$ abuts to the extreme left of the groove $L_2$ (position of FIG. 4B).

From this moment on, if one continues to shift rod E in the rightward direction, throttles A and B remain motionless in a fully open position corresponding to the maximum tension of means $R_4$, i.e. bolts $J_1$ and $J_3$ slide relatively to the left in grooves $L_1$ and $L_3$, respectively. Bolt $J_2$ is now forced to follow the movement of rod E to the right and thus causes throttle D to pivot at an angle proportional to the shifting of rod E. It is thus apparent that it is possible, with the aid of this system, to operate throttle D only when throttles A and B are fully open.

It is, of course, possible to conceive other devices achieving this result, but I believe that the device represented, illustrates sufficiently a possibility of operating the throttled valves in synchronism. It is pointed out, that the mechanical linkage of the valves and rod E is per se conventional and does not by itself constitute an inventive structure.

Besides, as already mentioned, the admission pipe for the very rich mixture may be placed, at least over the end part of its length, inside the air admission pipe, provided that said end part opens as near as possible to the inlet port of the cylinder and is oriented towards the spark plug and, for instance, in the close vicinity of the inlet valve in the case of an engine provided with the same.

It is also important, in order to ensure a satisfactory functioning of the above-described feeding device, at the positions of the accelerator corresponding to the opening of the throttle-valve in the connecting pipe, that the fall of pressure in the vicinity of the opening of the latter into the air-admission pipe, be higher than that existing in the vicinity of the opening of said connecting pipe in the rich mixture pipe, so as to make possible the transfer of a part of said rich mixture to the air-admission pipe, when the throttle-valve of the connecting pipe is opened.

Such a result may be achieved by providing the air-admission pipe (FIG. 3) in its upper part, above the connecting pipe opening, with a choke tube F or any other section-limiting device capable of creating in said air-admission pipe a more intensive pressure fall than that occurring in the rich mixture pipe.

It will be understood that this invention is susceptible to modification in order to adapt it to different usages and conditions and, accordingly, it is desired to comprehend such modifications within this invention as may fall within the scope of the appended claims.

What I claim is:

1. A process for feeding with a carburetted mixture a controlled ignition engine of the type comprising at least one cylinder provided with a substantially homogeneous combustion chamber, a spark plug, inlet and outlet port means, comprising the steps of providing two separate gaseous streams of different richness, simultaneously introducing said gaseous streams in the form of a carburetted heterogeneous mixture into said cylinder, and directing the richer one of said gaseous streams substantially in the direction of said spark plug, and continuously controlling the respective proportions of said separate gaseous streams so as to determine both the average richness of the introduced mixture and its degree of heterogeneity, thereby providing the possibility of operating the engine at will either with a lean mixture or, if desired, with a mixture of an average high richness, as required for obtaining the maximum power of the engine.

2. A process according to claim 1, comprising the step of so adjusting the proportion of said gaseous streams that the average fuel content of said carburetted mixture in said cylinder is lower than that of a stoichiometrical mixture and the local fuel content of said carburetted mixture, in vicinity of said spark plug, is high enough for providing ignition of said mixture.

3. A process according to claim 2, wherein the leaner gaseous stream consists of air.

4. A process according to claim 3, wherein the ratio of the streams to one another is kept substantially constant.

5. A process according to claim 2, wherein the average richness of the heterogeneous mixture is controlled by varying the richness of the leaner mixture.

6. A process according to claim 5, wherein the leaner mixture is obtained by transferring to the air stream a portion of the rich mixture.

7. A process acording to claim 2, wherein the average richness of the heterogeneous mixture is comprised between 0.5 and 1.1.

8. A process according to claim 2, wherein the richness of the richest gaseous stream is at least of 5.

9. A process according to claim 2, wherein the leaner gaseous stream consists of an air fuel mixture the richness of which is lower than 1.

10. A process for feeding with a carburetted mixture a controlled ignition engine of the type comprising at least one cylinder provided with a substantially homogeneous hemispheric-type combustion chamber, a spark plug, an inlet port and an outlet port, comprising the steps of providing two separate gaseous streams of different richness, simultaneously introducing said gaseous streams in the form of a carburetted heterogeneous mixture into said cylinder, and directing the richest one of said gaseous streams substantially in the direction of said spark plug, and continuously controlling the respective proportions of said separate gaseous streams so as to determine both the average richness of the introduced mixture and its degree of heterogeneity, thereby providing the possibility of operating the engine at will either with a lean mixture or, if desired, with a mixture of an average high richness, as required for obtaining the maximum power of the engine.

11. A process for feeding with a carburetted mixture a controlled ignition engine of the type comprising at least one cylinder provided with a substantially homogeneous hemispheric-type combustion chamber, a spark plug, an inlet port and an outlet port and a plurality of valves in head, comprising the steps of providing two separate gaseous streams of different richness, simultaneously introducing said gaseous streams in the form of a carburetted heterogeneous mixture into said cylinder, and directing the richest one of said gaseous streams substantially in the direction of said spark plug, and continuously controlling the respective proportions of said separate gaseous streams so as to determine both the average richness of the introduced mixture and its degree of heterogeneity, thereby providing the possibility of operating the engine at will either with a lean mixture or, if desired, with a mixture of an average high richness, as required for obtaining the maximum power of the engine.

12. A device for feeding controlled ignition engine comprising at least one cylinder and an associated combustion chamber with a mixture of two gaseous streams of different and adjustable richness comprising, in combination a first admission pipe for air to said combustion chamber, carburetting means, a second admission pipe associated with said carburetting means and supplying to said combustion chambers a very rich carburetted mixture, a pair of synchronously operating throttle valves in said first and said second admission pipe, respectively and controlling the useful section thereof, and a connecting pipe connecting said first and said second admission pipe and opening into said second admission pipe below said carburetting means, and a further throttle valve in said connecting pipe controlling the useful section of the latter so as to adjust the proportion of very rich mixture to be supplied from said second pipe to said first pipe, thereby controlling the relative richness of the two streams.

13. A device according to claim 12, further comprising a single drive means synchronizing the operation of said pair of throttle valves.

14. A device according to claim 12, wherein the carburetting means consists of a fuel injector and an air supply means.

15. A device according to claim 12, wherein said pair of synchronized throttle valves are associated with said further throttle valve in said connecting pipe in such a manner that the opening of the latter, providing for the transfer of a determined portion of the very rich mixture from said second pipe to said first pipe, does not occur until said synchronized throttle valves are substantially completely opened.

16. A device according to claim 12, wherein said first admission pipe for air is provided, above the opening of said connecting pipe therein, with a narrowing portion, creating in the vicinity of said connecting pipe, during the suction period, a more intensive pressure drop than that prevailing in said second pipe containing the very rich mixture.

References Cited in the file of this patent

UNITED STATES PATENTS

| | | |
|---|---|---|
| 1,905,258 | Williams | Apr. 25, 1933 |
| 1,977,200 | Osterberg | Oct. 16, 1934 |
| 2,157,034 | Tice | May 2, 1939 |
| 2,440,572 | Brandenburg et al. | Apr. 27, 1948 |
| 2,711,723 | Summers | June 28, 1955 |
| 2,734,729 | Loftin | Feb. 14, 1956 |
| 2,884,913 | Heintz | May 5, 1959 |